(12) United States Patent
Yamauchi (10) Patent No.: US 7,605,198 B2
(45) Date of Patent: Oct. 20, 2009

(54) MOLDING RESIN COMPOSITION

(75) Inventor: Shigeru Yamauchi, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 236 days.

(21) Appl. No.: 11/744,333

(22) Filed: May 4, 2007

(65) Prior Publication Data

US 2009/0023841 A1    Jan. 22, 2009

(51) Int. Cl.
*C08L 1/00* (2006.01)

(52) U.S. Cl. .................................................. 524/18
(58) Field of Classification Search .................. 524/18
See application file for complete search history.

(56) References Cited

U.S. PATENT DOCUMENTS 6,166,143 A * 12/2000 Watanabe et al. ........... 525/208

FOREIGN PATENT DOCUMENTS

| JP | 2003-213099 A | 7/2003 |
| JP | 2004-210893 A | 7/2004 |
| JP | 2004210893 A * | 7/2004 |

OTHER PUBLICATIONS

Translation of JP 2004-210893, Jul. 2004.*

* cited by examiner

*Primary Examiner*—Ling-Siu Choi
*Assistant Examiner*—Hui Chin
(74) *Attorney, Agent, or Firm*—Connolly Bove Lodge & Hutz LLP (57) ABSTRACT

A molding resin composition which includes (a) an aromatic polyester, (b) a tackifier, (c) a polyol compound having two or more hydroxy groups per molecule and (d) a polyolefin, wherein the polyolefin (d) is present in an amount of 5 to 40 parts by weight per 100 parts by weight of the aromatic polyester (a) and the polyolefin (d) combined, has an excellent adhesion to polyolefins, metals and PVC, and also has an excellent gasoline resistance.

14 Claims, 4 Drawing Sheets

FIG.1A
CONDUCTOR BEFORE MOLDING

FIG.1B
MOLD SHAPE (MOLD HALF)

FIG.1C
MOLD SHAPE (MOLD DURING MOLDING)

FIG.1D
SHAPE OF MOLDED ARTICLE

MOLDING RESIN COMPOSITION

BACKGROUND OF THE INVENTION

1. Field of the Invention

The present invention relates to a molding resin composition.

2. Description of the Prior Art

Figure 5:
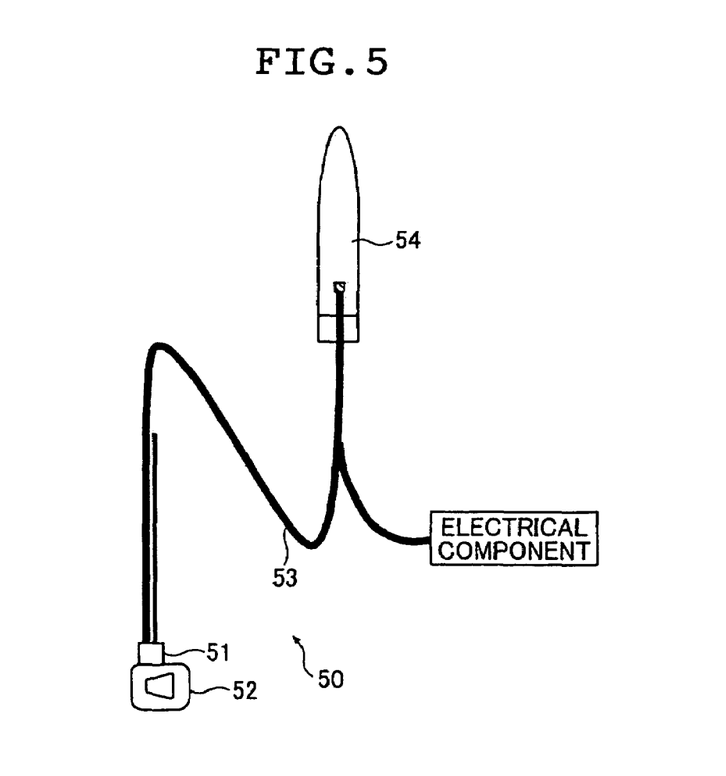
FIG. 5 shows a conventional wiring harness.

Moisture infiltrates the electrical wiring used in automobiles and the like, such as wiring harnesses, from areas such as grounded portions thereof. Generally, to keep such moisture from entering the automobile, it has been necessary, as in the wiring harness 50 shown in FIG. 5, to cut somewhere along its length a conductor 53 that is joined through a crimped portion 51 to a junction 52, and thus provide, for example, a portion 54 that is open to the atmosphere. As a result, the placement of the wiring imposes limitations on the design and other aspects, which is detrimental partially in terms of cost.

Figure 6:
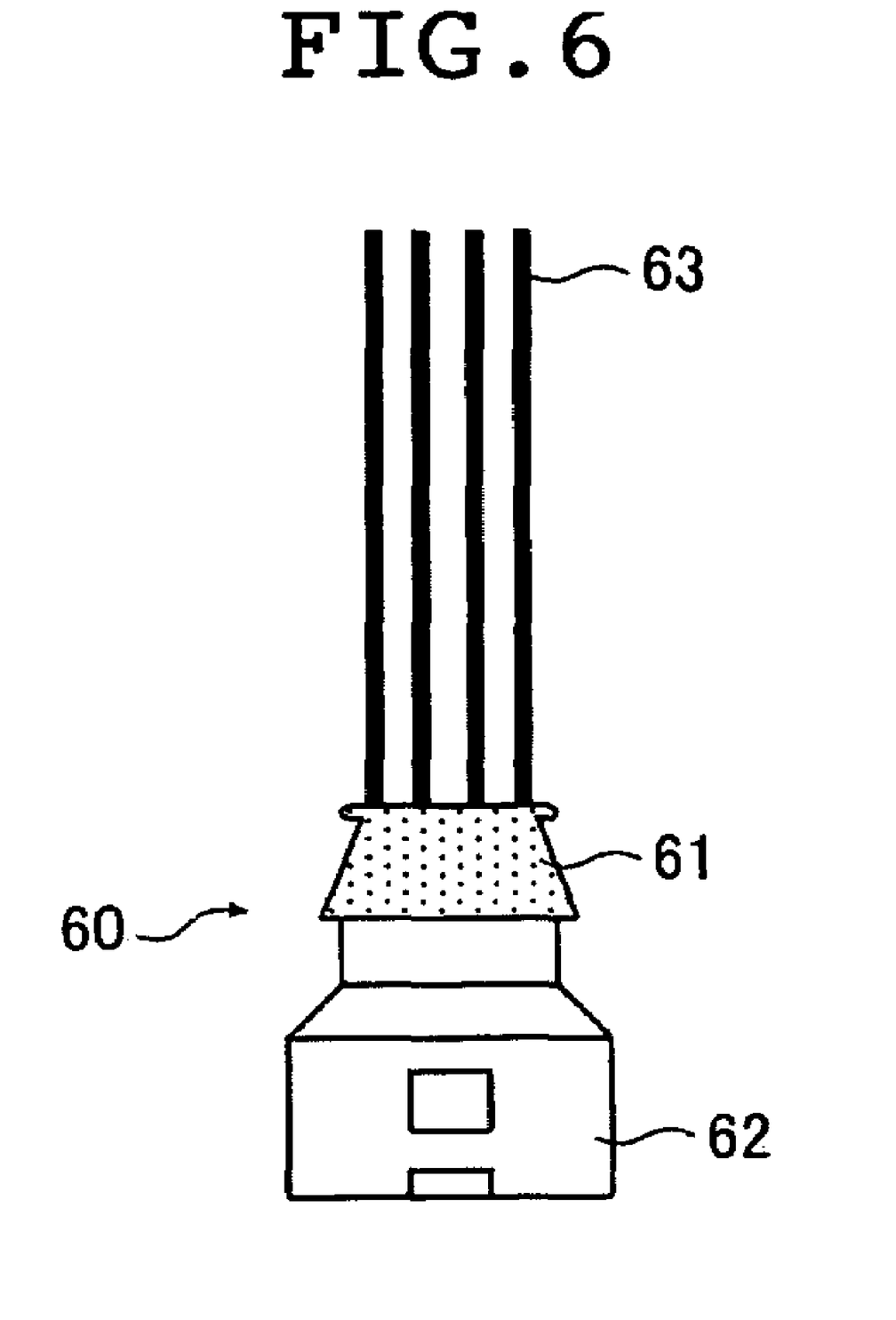
FIG. 6 shows a conventional connector.

Also, there are methods for rendering electrical connectors waterproof or watertight by casting and curing, for example, a one-component silicone resin composition. Specifically, a process adapted for a connector 60 as shown in FIG. 6 is known that involves using a rubber member made of an ethylene-propylene copolymer (EPDM) or the like as a molding portion 61 and pouring such a material as one-component silicone resin composition into the region where a junction 62 and conductors 63 meet. However, because materials such as one-component silicone resin compositions have a long curing time, the resulting assembly must then be allowed to stand within the production facility for about 1 to 2 hours.

Various polyester resins are known which are good in such characteristics as flexibility, heat resistance, chemical resistance, oil resistance, extensibility and moldability. However, in hitherto known polyester resins which are good in some of the characteristics as above, the balance between the moldability and flexibility has been poor, making the use of such resins as hot-melt molding materials impossible. For instance, resins which have a low viscosity and are easy to mold have a very low flexibility once molded. On the other hand, resins endowed with a higher flexibility have been difficult to mold.

Additional examples include urethane hot-melt resins, polyamide hot-melt resins, EVA hot-melt resins, and silicone fillers. Unfortunately, these are difficult to use as hot-melt materials for molding.

To address the above problems, the inventor, along with colleagues, has earlier disclosed molding resin compositions which contain an aromatic polyester and can be used as hot-melt resin compositions for molding (see JP 2003-213099 A (Patent Document 1) and JP 2004-210893 A (Patent Document 2)).

Although nonrigid polyvinyl chloride (PVC) has hitherto been used as a wire coating material in harnesses and connectors, a changeover to polyolefin materials is underway in order to reduce the use of halogens.

BRIEF SUMMARY OF THE INVENTION

The molding resin compositions described in above Patent Documents 1 and 2 have excellent flexibility, heat resistance, oil resistance and extensibility, in addition to which they have a low viscosity and thus excellent moldability. However, they lack sufficient adhesion to polyolefins. Hot melt resins composed primarily of polyolefins can improve adhesion to polyolefins, but are unable to ensure adhesion to metals and PVC. Because metal is generally used in such places as the crimped portions on wiring harnesses, it has not been possible to use polyolefin hot-melt resins as the sealing material for the crimped portions. Moreover, under prolonged contact with gasoline, polyolefin hot-melt resins whiten and may even undergo cracking and other undesirable effects.

It is therefore an object of the invention to provide a molding resin composition which has an excellent adhesion to polyolefins, metals and PVC, and an excellent gasoline resistance.

As a result of extensive investigations, the inventor has discovered that a molding resin composition which includes an aromatic polyester, a tackifier, a polyol compound and a polyolefin, wherein the polyolefin is included in an amount within a specific range, has an excellent adhesion to polyolefins, metals and PVC and an excellent gasoline resistance, and thus accomplished the invention.

Accordingly, the invention provides the molding resin composition recited in (1) to (14) below.

(1) A molding resin composition which includes (a) an aromatic polyester, (b) a tackifier, (c) a polyol compound having two or more hydroxy groups per molecule, and (d) a polyolefin, wherein the polyolefin (d) is present in an amount of 5 to 40 parts by weight per 100 parts by weight of the aromatic polyester (a) and the polyolefin (d) combined.

(2) The molding resin composition of (1) above, wherein the polyolefin (d) has polar groups.

(3) The molding resin composition of (2) above, wherein the polar groups are of at least one type selected from the group consisting of epoxy, carboxy and acid anhydride groups.

(4) The molding resin composition of (1) above, wherein the polyolefin (d) has epoxy groups, and carboxy groups and/or acid anhydride groups.

(5) The molding resin composition of (3) or (4) above, wherein the carboxy groups are carboxy groups derived from maleic acid and the acid anhydride groups are maleic anhydride groups.

(6) The molding resin composition of any one of (1) to (5) above, wherein the tackifier (b) is present in an amount of 1 to 50 parts by weight per 100 parts by weight of the aromatic polyester (a) and the polyolefin (d) combined.

(7) The molding resin composition of any one of (1) to (6) above, wherein the polyol compound (c) is present in an amount of 0.5 to 50 parts by weight per 100 parts by weight of the aromatic polyester (a) and the polyolefin (d) combined.

(8) The molding resin composition of any one of (1) to (7) above which has a viscosity at 190° C. of 10 to 500 Pa·s.

(9) The molding resin composition of any one of (1) to (8) above, wherein the aromatic polyester (a) is a polyester obtained by reacting an acid component which includes terephthalic acid and/or isophthalic acid with a hydroxy group component which includes at least one selected from the group consisting of ethylene glycol, polytetramethylene ether glycol, neopentyl glycol and 1,4-butanediol.

(10) The molding resin composition of any one of (1) to (8) above, wherein the aromatic polyester (a) includes:

a polyester A obtained by reacting an acid component which includes terephthalic acid and isophthalic acid with a hydroxy group component which includes ethylene glycol and neopentyl glycol; and a polyester B obtained by reacting an acid component which includes terephthalic acid and isophthalic acid with a hydroxy group component which includes 1,4-butanediol and polytetramethylene ether glycol.

(11) The molding resin composition of (10) above, wherein the aromatic polyester (a) further includes a polyester C obtained by reacting an acid component which includes terephthalic acid, isophthalic acid and sebacic acid with a hydroxy group component which includes 1,4-butanediol.

(12) The molding resin composition of (10) or (11) above, wherein the aromatic polyester (a) further includes a polyester D obtained by reacting an acid component which includes terephthalic acid, isophthalic acid and ε-caprolactone with a hydroxy group component which includes 1,4-butanediol.

(13) The molding resin composition of any one of (1) to (12) above, wherein the tackifier (b) is a rosin-based tackifier.

(14) The molding resin composition of (13) above, wherein the rosin-based tackifier is a rosin diol.

The molding resin composition of the invention has an excellent adhesion to polyolefins, metals and PVC, and also has an excellent gasoline resistance. In particular, when a polyolefin having polar groups is used, the aromatic polyester and polyolefin do not separate even after the inventive molding resin composition has been molten for an extended period of time, thus enabling the adhesive properties to be maintained.

DETAILED DESCRIPTION OF THE PREFERRED EMBODIMENT

The invention is described more fully below.

The molding resin composition of the invention (also referred to below as "the inventive composition") includes (a) an aromatic polyester, (b) a tackifier, (c) a polyol compound having two or more hydroxy groups per molecule, and (d) a polyolefin. The polyolefin (d) is present in an amount of 5 to 40 parts by weight per 100 parts by weight of the aromatic polyester (a) and the polyolefin (d) combined.

<Aromatic Polyester (a)>

The aromatic polyester (a) is not subject to any particular limitation. Use may be made of any known aromatic polyester, although an aromatic polyester obtained by a condensation reaction between a fatty acid and a glycol is preferred.

The aromatic polyester (a) is exemplified by aromatic polyesters which include a polyester obtained by reacting an acid component which includes terephthalic acid and/or isophthalic acid with a hydroxy group component which includes at least one selected from the group consisting of ethylene glycol (abbreviated below as "EG"), polytetramethylene ether glycol (abbreviated below as "PTMG"), neopentyl glycol (abbreviated below as "NPG") and 1,4-butanediol (abbreviated below as "1,4-BD"). Aromatic polyesters which include the polyesters A to D described below are preferred.

Polyester A is a polyester obtained by a condensation reaction using a mixture of terephthalic acid and isophthalic acid as the acid component and using a mixture of NPG and EG as the hydroxy group component. Polyester A has a viscosity at 190° C. of preferably 0.5 to 2 Pa·s, and more preferably 0.7 to 1.5 Pa·s.

Similarly, Polyester B is a polyester obtained by a condensation reaction using a mixture of terephthalic acid and isophthalic acid as the acid component and using a mixture of PTMG and 1,4-BD as the hydroxy group component. Polyester B has a melting index (melt index) (abbreviated below as "MI"), which is an indicator of its flow properties in a molten state, of preferably at least 10, and more preferably 13 to 50, at 200° C. It is desirable for Polyester B to have an MI in this range because the viscosity during molding will be kept low and an excellent heat resistance will be provided after molding.

Here, the PTMG is not subject to any particular limitation, provided it is a polymer obtained by polymerizing 1,4-BD. The PTMG has a number-average molecular weight of preferably at least 2,000. A commercial PTMG that may be used is H-283 manufactured by Mitsubishi Chemical Corporation.

Polyester C is a polyester obtained by a condensation reaction using a mixture of terephthalic acid, isophthalic acid and sebacic acid as the acid component and using 1,4-BD as the hydroxy group component. Polyester C has a viscosity at 190° C. of preferably 200 to 700 Pa·s, and more preferably 400 to 600 Pa·s.

Polyester D is a polyester obtained by a condensation reaction using a mixture of terephthalic acid, isophthalic acid and ε-caprolactone as the acid component and using 1,4-BD as the hydroxy group component. Polyester D has a viscosity at 190° C. of preferably 100 to 300 Pa·s, and more preferably 150 to 200 Pa·s.

The aromatic polyester (a) preferably includes at least two types of polyesters selected from the group consisting of above Polyesters A, B, C and D, and more preferably includes above Polyesters A and B. The reason is that, by including Polyester B having excellent flexibility, heat resistance, chemical resistance, oil resistance and extensibility and by including also Polyester A having a low viscosity and excellent moldability, the viscosity of the resulting molding resin composition during molding is kept low, and flexibility is imparted to the molded and hardened material. Moreover, for similar reasons, it is preferable that the aromatic polyester (a) include Polyester A, Polyester B and also Polyester C and/or Polyester D.

Polyesters A, B, C and D are included within the aromatic polyester (a) in proportions, based on the total weight of aromatic polyester (a), of preferably 10 to 50 wt % of Polyester A, 10 to 50 wt % of Polyester B, 0 to 30 wt % of Polyester C, and 0 to 30 wt % of Polyester D; more preferably 25 to 45 wt % of Polyester A, 20 to 40 wt % of Polyester B, 0 to 20 wt % of Polyester C, and 0 to 25 wt % of Polyester D; and even more preferably 30 to 40 wt % of Polyester A, 25 to 35 wt % of Polyester B, 0 to 15 wt % of Polyester C, and 0 to 20 wt % of Polyester D.

It is preferable for the proportions in which Polyesters A, B, C and D are included to fall within these ranges because the viscosity of the resulting molding resin composition during molding can be kept low, with flexibility being yet conferred on the molded and hardened material, and also because the molded and hardened material will be provided with an excellent resistance to oil and gasoline. Moreover, the hardening time after molding will be reduced, obviating the need for maturing.

The inventive composition endowed with such properties further has an excellent resistance to heat shock and is able to follow expansion and shrinkage of the adherend during heat cycling, which makes it highly useful as a hot-melt molding material.

<Tackifier (b)>

The tackifier (b) may be a known tackifier, examples of which include rosin-based tackifiers, terpene-based tackifiers and petroleum resin-based tackifiers.

Rosin-based tackifiers are exemplified by the glycerol or pentaerythritol esters of resin acids composed primarily of abietic acid found in pine balsam and wood turpentine made by dry distillation of pinewood, and by hydrogenated products and disproportionated products thereof. Preferred examples include gum rosin, tall oil rosin, wood rosin, hydrogenated rosin, disproportionated rosin, polymerized rosin, modified rosin, and rosin ester (namely, rosin diol).

Terpene-based tackifiers are exemplified by those substances obtained by polymerizing a terpene oil in pine trees or a naturally occurring terpene present in such materials as the rind of oranges. Preferred examples include terpene resin, aromatic modified terpene resin, terpene phenolic resin and hydrogenated terpene resin.

Petroleum resin-based tackifiers are exemplified by aliphatic, alicyclic and aromatic resins obtained from petroleum feedstock. Preferred examples include $C_5$ petroleum resins, $C_9$ petroleum resins, copolymer-based petroleum resins, alicyclic saturated hydrocarbon resins and styrene-based petroleum resins.

It is preferable to use one of the foregoing rosin-based tackifiers as the tackifier (b) because the resulting composition has a lower viscosity and is easier to mold. The use of a rosin diol is especially preferred because it improves the resulting molding resin composition in the extensibility and the adhesion to polyolefins, metals and PVC and, in addition, provides the composition with a good balance of heat resistance and flexibility and a good gasoline resistance. Specific examples of suitable rosin diols include PINECRYSTAL series D-6011, KE-615-3 and D-6240 (all products of Arakawa Chemical Industries, Ltd.).

The above tackifier (b) is included in an amount, per 100 parts by weight of the aromatic polyester (a) and the polyolefin (d) combined, of preferably 1 to 50 parts by weight, and more preferably 10 to 40 parts by weight. Within this range, the resulting molding resin composition has an improved extensibility, an improved adhesion to polyolefins, metals and PVC, a good balance of heat resistance and flexibility, and a good gasoline resistance.

<Polyol Compound (c)>

The polyol compound (c) is a polyol compound having two or more hydroxy groups per molecule. It is not subject to any particular limitation, provided it acts as a compatibilizer that enables the above-described aromatic polyester (a) and the above-described tackifier (b) to be intimately mixed. Specific examples of such compound include ethylene glycol, propylene glycol, butanediol, polycarbonate diol, polycaprolactone, diethylene glycol, glycerol, hexanetriol, trimethylolpropane and pentaerythritol. Additional examples include polyhydric alcohols such as polyether polyols, e.g., polytetramethylene ether glycol, polyethylene glycol, polypropylene glycol, polyoxypropylene diol, polyoxypropylene triol, polyoxybutylene glycol; polyolefin polyols, e.g., polybutadiene polyol, polyisoprene glycol; adipate polyols; lactone polyols; and polyester polyols, e.g., castor oil; as well as polyhydric phenols such as resorcin and bisphenol. These polyols may be used singly or as combinations of two or more thereof.

Of the above, polycarbonate diol and polycaprolactone are preferred as having the compatibilizer effect even if used in a small amount. The use of polycarbonate diol is especially preferred because of its excellent resistance to high temperature and high humidity.

The polyol to be used has an average molecular weight of preferably 500 to 10,000, more preferably 1,000 to 10,000, and even more preferably 2,000 to 10,000.

The above polyol compound (c) is included in an amount, per 100 parts by weight of the aromatic polyester (a) and the polyolefin (d) combined, of preferably 0.5 to 50 parts by weight, more preferably 1 to 20 parts by weight, and even more preferably 2 to 10 parts by weight. Within this range, the polyol compound is able to fully compatibilize the aromatic polyester (a) and the tackifier (b) without lowering the properties (heat resistance, flexibility, gasoline resistance) of the polyester.

As noted above, the inventive composition, because it includes the above-described tackifier (b) and polyol compound (c), has an improved extensibility, an improved adhesion to polyolefins, metals and PVC, and a good balance of heat resistance and flexibility. Moreover, separation of the aromatic polyester (a) and the tackifier (b) that occurs within the composition while molten is prevented, in addition to which the oil resistance and especially the gasoline resistance, which decline when the tackifier (b) alone is added, are good.

The reason for the above appears to be that, with the addition of the polyol compound (c), the tackifier (b) is preferentially incorporated into noncrystalline portions of the aromatic polyester (a).

<Polyolefin (d)>

The polyolefin (d) is not subject to any particular limitation. Specific examples include homopolymers of α-olefins such as ethylene, propylene, butylene, pentene and 4-methyl-1-pentene, copolymers of two or more of these α-olefins, and copolymers of these α-olefins with other copolymerizable monomers. These may be used singly or as combinations of two or more thereof.

Of these polyolefins, polyethylene is preferred on account of its excellent gasoline resistance.

The polyolefin (d) preferably has polar groups.

Polyolefins generally have a low polarity, whereas the above-described aromatic polyester (a) has a high polarity. Hence, when the inventive composition is placed in a molten state for an extended period of time during or after production of the inventive composition, the aromatic polyester (a) and the polyolefin (d) may separate so that they cannot be fully blended even with repeated stirring, resulting in a decline in the adhesive properties. However, if the above polyolefin (d) has polar groups, separation will not occur even after the composition has been molten for an extended period of time, enabling the adhesion properties to be maintained.

The polar groups are not subject to any particular limitation. Illustrative examples include epoxy, carboxy, acid anhydride, amino, isocyanate, hydroxy, nitro and sulfonic acid groups. The above polyolefin (d) may have functional groups of one such type, or may have functional groups of several such types.

For excellent adhesion to polar materials, it is preferable that the polar groups be of at least one type selected from the group consisting of epoxy, carboxy and acid anhydride groups. Epoxy groups are especially preferred.

It is preferable for the polyolefin (d) to have epoxy groups, and also carboxy groups and/or acid anhydride groups.

The carboxy groups are preferably carboxy groups derived from maleic acid, and the acid anhydride groups are preferably maleic anhydride groups.

The polyolefin having polar groups may be obtained by, for example, a method that involves copolymerizing an olefin with a polar group-bearing polymerizable monomer (e.g., glycidyl methacrylate). Alternatively, use may be made of a commercial product.

The polyolefin (d) is included in an amount, per 100 parts by weight of the above aromatic polyester (a) and the above polyolefin (d) combined, of 5 to 40 parts by weight. Including the polyolefin (d) in this range provides the inventive composition with a good balance between adhesion to polyolefins and adhesion to metals and PVC, and with an excellent gasoline resistance.

To further improve these properties, the amount of the polyolefin (d) included per 100 parts by weight of the aromatic polyester (a) and the polyolefin (d) combined is more preferably 10 to 40 parts by weight, and even more preferably 20 to 40 parts by weight.

Because the inventive composition includes the above polyolefin (d) in a specific proportion, the adhesion to polyolefins can be enhanced while keeping such properties as the adhesion to metals and PVC and gasoline resistance high. In particular, when the polyolefin having polar groups as above is used, separation does not arise even after the composition has been molten for an extended period of time, thus enabling the adhesive properties to be maintained.

The inventive composition may optionally include, if necessary, various additives such as reinforcers, antidegradants, antioxidants, fillers, plasticizers, heat stabilizers, ultraviolet absorbers, lubricants, waxes, colorants, crystallization promoters and reinforcing fibers, insofar as the objects of the invention are achievable.

The method of preparing the inventive composition is not subject to any particular limitation. For example, preparation may be carried out by mixing the aromatic polyester (a), the tackifier (b), the polyol compound (c), the polyolefin (d) and, where necessary, various additives using rolls, a kneader, an extruder, a universal mixer or the like.

For the inventive composition to have an excellent moldability, the viscosity at 190° C. should preferably be from 10 to 500 Pa·s, and more preferably from 10 to 100 Pa s.

It is desirable that the molding resin composition be capable of being discharged and molded at a pressure of less than 5 MPa, preferably of 0.2 to 1.0 MPa, and more preferably of 0.3 to 0.5 MPa. Such discharge and molding is carried out in a range of preferably 120 to 230° C., and more preferably 180 to 210° C. This temperature range is preferred because the stability of the molding resin composition used in such discharge and molding is enhanced and the viscosity of the composition when molten falls within the above-indicated range. The pressure as above refers to the pressure at which the molding resin composition is discharged from a discharge opening during the foregoing discharge and molding operation.

The inventive composition has excellent properties, including adhesion to polyolefins, metals and PVC, gasoline resistance, extensibility and flexibility. Moreover, it has a low viscosity and thus an excellent moldability. In particular, when polyolefins having polar groups are used, the aromatic polyester and the polyolefin do not separate even when the inventive composition has been molten for an extended period of time, enabling the adhesive properties of the composition to be maintained.

Because the inventive composition has the excellent properties described above, it is useful as a sealant or waterproof protectant for the ends of connectors, wiring harnesses and the like. It is also useful as a potting material (i.e., a filling material for embedding an entire electrical circuit so as to protect the circuit from shock, vibrations, moisture, and so forth).

The inventive composition may be used to form a waterproof protective covering on the ends of electronic devices by a method which includes the steps of melting the molding resin composition of the invention, then either discharging and molding or coating the molten molding resin composition onto the end of an electronic device at a pressure of less than 5 MPa. The pressure during discharging and molding or coating is preferably 0.2 to 1.0 MPa, and more preferably 0.3 to 0.5 MPa.

In the above melting step, the molding resin composition of the invention is heated and melted at a temperature of from 160 to 230° C., and preferably from 180 to 210° C.

In the above discharging and molding or coating step, the molding resin composition that has been melted in the melting step is discharged and molded or coated onto the end of an electronic device at a pressure of less than 5 MPa.

To be more specific: In the discharge and molding operation, the molten molding resin composition is discharged into a mold in which the end of an electronic device has been placed using an apparatus such as a hot melt gun or a hot melt applicator at a pressure of less than 5 MPa, and preferably of 1 to 4 MPa, then is molded. Alternatively, the molten composition is discharged with a hot melt gun or a hot melt applicator so as to carry out potting.

In the coating operation, the molten molding resin composition is coated onto the end of an electronic device using an apparatus such as a hot melt spray gun at a pressure of less than 5 MPa, and preferably of 1 to 4 MPa.

Employing a waterproof protective cover forming method that uses the inventive composition is highly advantageous because the operation can be carried out at a pressure of 0.3 to 0.5 MPa and a melting temperature of 180 to 230° C., as opposed to a higher pressure of 40 to 120 MPa and a higher melting temperature of 250 to 300° C. typically employed in conventional injection molding.

Because molding at such a low temperature and a low pressure is possible using the above-described production method, as shown in FIGS. 1A to 1D, a polyolefin-coated conductor 2 having a stripped section 1 can be sealed with a production apparatus that uses an aluminum mold 3 and a rubber packing 4, resulting in a favorable molding cost reduction. Specifically, in the mold shape shown in FIG. 1C (in which the aluminum mold 3 and the rubber packing 4 are closed), the hot melt (HM) material is poured in through an inlet 5 (in the direction of the arrow), passed through channels 6, and delivered into HM molding cavities 7. The HM material is then molded by the cavities 7, following which it is removed from the mold, giving molded articles each having the shape shown in FIG. 1D that includes a molded portion 8.

Also, the ability to carry out molding at low temperature and pressure allows molding to be achieved without damaging, for example, electronic components on a substrate, thus enabling the entire substrate to be waterproofed. Moreover, unlike the use of one-component silicone resin compositions, the substrate and the electronic components need not be covered with a case, helping to reduce the cost of the product.

Molding a two-component urethane or epoxy composition requires additional steps such as heating, in addition to which curing takes on the order of 15 to 120 minutes. By contrast, using the inventive composition, with natural cooling, it takes from several seconds to several tens of seconds for hardening to reach completion after molding. This has the advantage of making it possible to remove the molded article from the mold within a period of several minutes. More specifically, using the invention composition, pouring an HM material for molding takes only 10 seconds, and the removal of the hardened material from the mold is possible within one minute with natural cooling. Moreover, the productivity is also excellent, owing to a lack of deformation after removal from the mold and the absence of a need for maturing.

The electronic device ends mentioned above are exemplified by the ends of connectors and wiring harnesses, the connections between cables, and electronic device substrates. Such ends are often made of materials such as metal, PVC or polyolefin.

Figure 2:
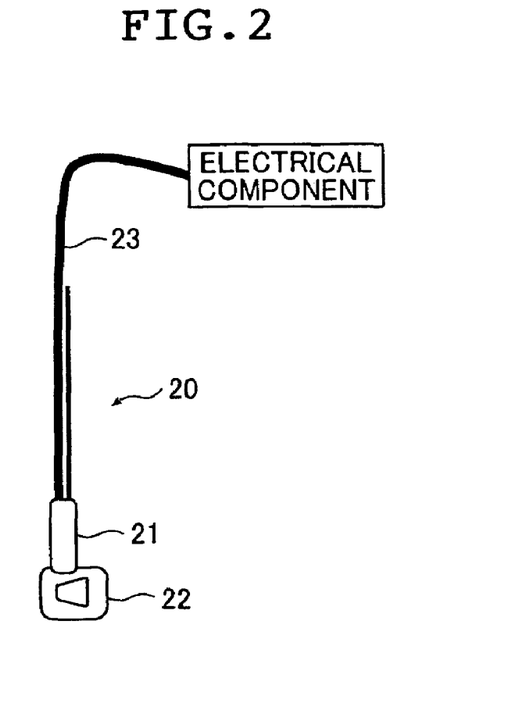
FIG. 2 shows a wiring harness which has been sealed with the molding resin composition of the invention.

Hence, it is desirable for the waterproof protective coverings formed on the ends of electronic devices to have an excellent adhesion to metals, PVC and polyolefins because this quality enables the coverings to be applied to, e.g., the ends of connectors and wiring harnesses, connections between cables, and electronic device substrates as above. In particular, in wiring harnesses used in automobiles in which moisture infiltrates from grounded portions thereof, such as a wiring harness 20 shown in FIG. 2, using the waterproof protective covering produced by the above-described method as a molded portion 21 eliminates the need for an operation in which, for instance, a conductor 23 connected to a junction 22 through the molded portion 21 is cut somewhere along its length to provide a portion that is open to the atmosphere. This eliminates constraints on the design and the like, lowers costs, and is highly amenable to mass production.

EXAMPLES

The following examples more fully illustrate but do not limit the invention.

(Polyesters A to D)

The polyesters need only include the target acid and glycol components. Elitel UE3320 produced by Unitika, Ltd. was used as Polyester A, Hytrel 4057 produced by DuPont-Toray Co., Ltd. was used as Polyester B, Elitel UE3410produced by Unitika was used as Polyester C, and Elitel UE3800 produced by Unitika was used as Polyester D. The molar ratios of the acid components and the glycol components in Polyesters A to D are shown in Table 1 below.

TABLE 1

|  | Polyester A | Polyester B | Polyester C | Polyester D |
| --- | --- | --- | --- | --- |
| Terephthalic acid | 1.0 | 1.0 | 1.0 | 1.0 |
| Isophthalic acid | 0.16 | 0.46 | 0.25 | 0.1 |
| NPG | 1.0 | — | — | — |
| EG | 0.9 | — | — | — |
| 1,4-BG | — | 1.0 | 0.7 | 0.7 |
| PTMG | — | 0.34 | — | — |
| Sebacic acid | — | — | 0.6 | — |
| ε-Caprolactone | — | — | — | 0.1 |

(Numbers in table indicate molar ratios.)

Examples 1 to 10, and Comparative Examples 1 to 5

The various ingredients in Table 2 below were blended in the proportions indicated in Table 2 (parts by weight) with a kneader to prepare the molding resin compositions shown in Table 2.

The measurements described below were carried out on each of the molding resin compositions obtained.

The results are given in Table 2.

<Viscosity Measurement>

The viscosity was measured in accordance with JIS K7117-1. Using a B-type viscometer (manufactured by Tokyo Keiki Co., Ltd.), the molding resin composition obtained was melted at 190° C. for 30 minutes, and the viscosity of the molten composition was measured at a rotational speed of 10 rpm using a No. 3 rotor.

<Separation Immediately After Production and After Aging>

The molding resin composition immediately after production and the molding resin composition that had been aged by holding it for 72 hours after production at 200° C. were each cooled and hardened, following which the mixed state of the ingredients was visually examined. The compositions were rated as no-good, as being indicated by the symbol "X", if separation of the ingredients had occurred, and were rated as good, as being indicated by the symbol "○", if the ingredients were in an intimately mixed state.

<Hardness (Shore D)>

Measurement of the hardness (Shore D) was carried out in accordance with JIS Z2246-2000. The hardness of the molding resin composition obtained was measured with a Shore D durometer. Those compositions with a hardness of 100 or less were rated as good, as being indicated by the symbol "○".

<Flexibility>

The molding resin composition obtained was cooled and hardened, then pressed with a 140° C. press in the form of a sheet with a thickness of 1 mm to cut out a piece of 25 mm ×100 mm×1 mm in size, which was used as the test specimen. The test specimen was folded in two. If the test specimen did not break when folded, the composition was rated as good, as being indicated by the symbol "○", in flexibility.

<Adhesion>

(1) Adhesion to PVC

Figure 3A:
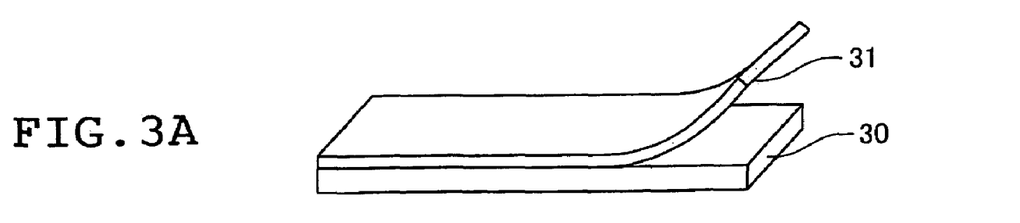
FIGS. 3A and 3B are, respectively, perspective and cross-sectional views depicting adhesion to PVC.

Measurement of the adhesion to PVC was carried out in accordance with JIS K6256-1999. PVC test pieces were prepared by cutting PVC having a thickness of 3 mm (trade name: Toughnyl; produced by Takafuji Corporation) in pieces measuring 25 mm×150 mm. The molding resin composition obtained was molded onto a PVC test piece as shown in FIG. 3A using a mold. A 180-degree peel test was then carried out in which a PVC test piece 30 and the molding resin composition shown with the numeral 31 were peeled apart by applying tensile stresses in the directions of the two arrows shown in FIG. 3B, respectively. The maximum tensile stress when the PVC test piece 30 and the molding resin composition 31 began to separate was measured. The pull rate was set at 50 mm/min.

Figure 3B:
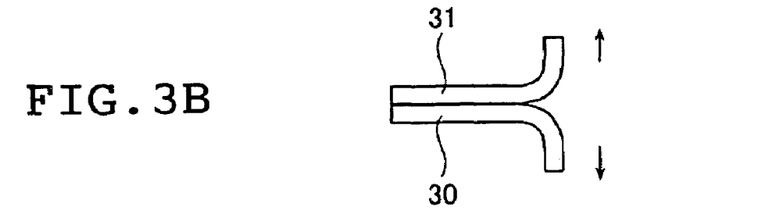

If measurement could not be carried out because the PVC test piece 30 and the molding resin composition 31 separated when the test specimen was mounted on the testing machine, the composition was rated as no-good, as being indicated by the symbol "X", in this adhesion.

(2) Adhesion to Metal

Figure 4A:
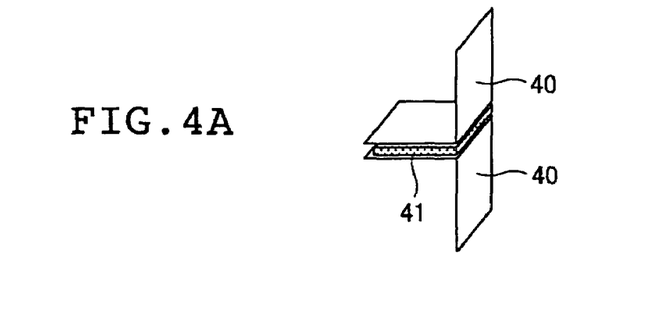
FIGS. 4A and 4B are, respectively, perspective and cross-sectional views depicting adhesion to metal (a copper plate).

Two copper sheets having a width of 30 mm, a length of 150 mm and a thickness of 0.8 mm were each folded in two at the 75 mm position along the length. The two folded copper sheets were then molded together with the molding resin composition obtained (so that the composition covered ½ of the flat surfaces of the copper sheets) as shown in FIG. 4A. Next, a 180° C. peel test was carried out in which tensile stresses were applied to the two copper sheets 40 in the directions of the two arrows shown in FIG. 4B, respectively, so as to peel the copper sheets 40 from the molding resin composition 41, and the maximum tensile stress when the copper sheets 40 and the molding resin composition 41 began to separate was measured. The pull rate was set at 50 mm/min.

Figure 4B:
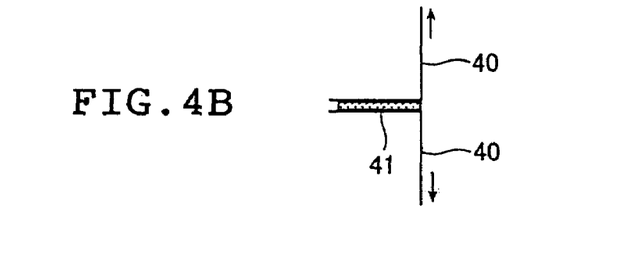

With respect to the adhesion to metal, the molding resin composition was rated as good, as being indicated by the symbol "○", if peeling occurred at a maximum tensile stress of 50 N/25 mm or more. If measurement could not be carried out because the copper sheets 40 and the molding resin composition 41 separated when the test specimen was mounted on the testing machine, the composition was rated as no-good, as being indicated by the symbol "X"

(3) Adhesion to Polypropylene (PP)

Aside from using corona surface-treated polypropylene (PP-N-BN, produced by Shin-Kobe Electric Machinery Co., Ltd.), the PP adhesion (initial) was measured in the same way as the above-described adhesion to PVC. Moreover, the test specimen prepared in the same way as for the PP adhesion (initial) test and aged at 80° C. and 95% RH for 96 hours was measured by the same method to determine the PP adhesion (under heat and moisture).

If measurement could not be carried out because the polypropylene (PP) test piece and the molding resin composition separated when the test specimen was mounted on the testing machine, the composition was rated as no-good, as being indicated by the symbol "X", in this adhesion.

<Moldability>

Figures 1A, 1B:
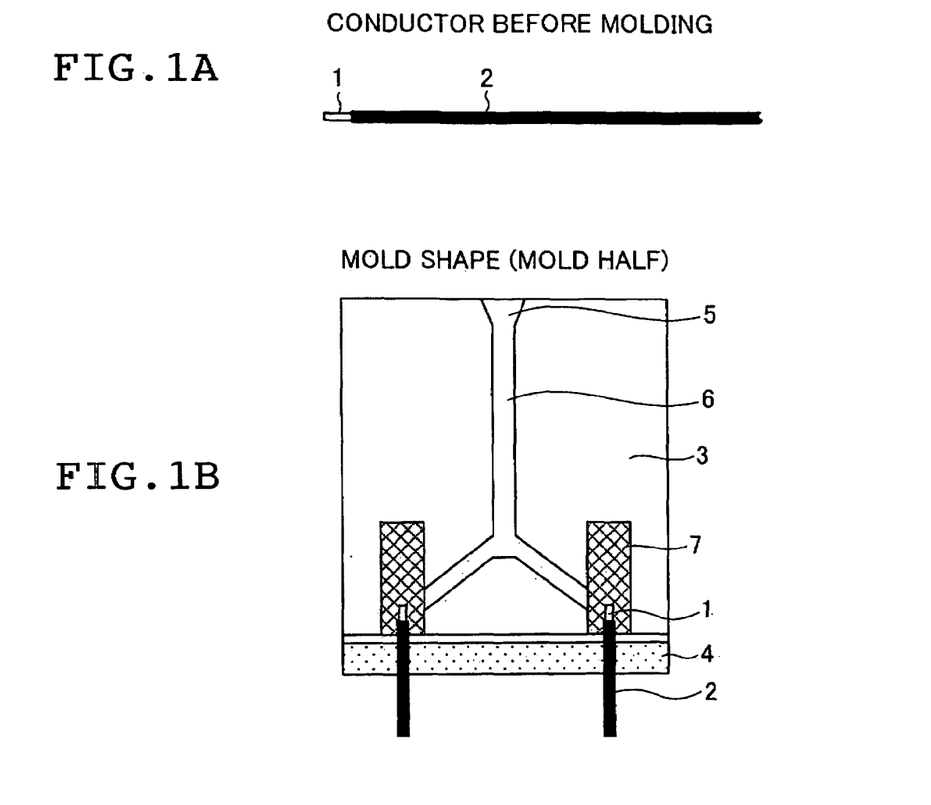
FIG. 1A shows a conductor prior to molding.
FIG. 1B shows the mold shape (mold half)
Figure 1C:
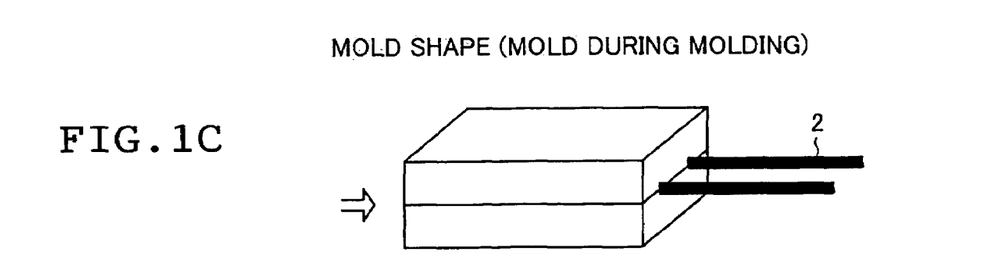
FIG. 1C shows the mold shape during molding.
Figure 1D:
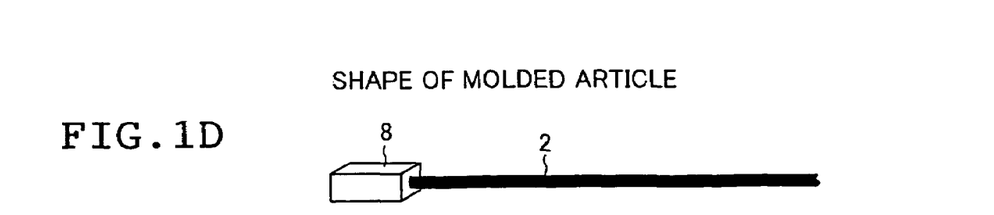
FIG. 1D shows the shape of the molded article.

The production apparatus with the aluminum mold and rubber packing shown in FIG. 1B was used to carry out molding on a PVC-coated cable.

(1) Moldability

Using a hot melt applicator, the molding resin composition obtained was poured in at an air pressure of 0.4 MPa, and the pour time up for the molding into the prescribed shape was measured. The composition was rated as good, as being indicated by the symbol "○", in moldability if the pour time was 10 seconds or less.

(2) Mold Releasability

The molding resin composition obtained was poured into the above-described mold, following which the time until the molded composition could be removed from the mold without deformation was measured. The composition was rated as good, as being indicated by the symbol "○", in mold releasability if removal from the mold within one minute was possible.

<Gasoline Resistance>

The molding resin composition obtained was cooled and hardened before it was immersed in 25° C. gasoline for 72 hours, then examined for the presence of whitening at the surface. The composition was rated as good, as being indicated by the symbol "○", if whitening did not arise, and was rated as no-good, as being indicated by the symbol "X", if whitening arose.

TABLE 2

(Part 1)

|  | Example 1 | Example 2 | Example 3 | Example 4 | Example 5 | Example 6 | Example 7 | Example 8 |
|---|---|---|---|---|---|---|---|---|
| Polyester A | 15 | 15 | 15 | 15 | 15 | 15 | 15 | 15 |
| Polyester B | 20 | 20 | 20 | 20 | 20 | 20 | 20 | 20 |
| Polyester C | 15 | 15 | 15 | 15 | 15 | 15 | 15 | 15 |
| Polyester D | 30 | 30 | 30 | 30 | 30 | 30 | 30 | 30 |
| Polypropylene | 20 |  |  |  | 5 | 5 |  |  |
| Low-density polyethylene |  | 20 |  |  |  |  |  |  |
| Polyethylene having epoxy groups |  |  | 20 |  | 15 |  | 20 |  |
| Polyethylene having epoxy groups and maleic acid groups |  |  |  | 20 |  | 15 |  | 20 |
| Rosin-based tackifier | 20 | 20 | 20 | 20 | 20 | 20 |  |  |
| Petroleum resin-based tackifier |  |  |  |  |  |  | 20 | 20 |
| Polycarbonate diol | 5 | 5 | 5 | 5 | 5 | 5 | 5 | 5 |
| Antidegradant | 0.5 | 0.5 | 0.5 | 0.5 | 0.5 | 0.5 | 0.5 | 0.5 |
| Viscosity (mPa · s) | 37,000 | 68,000 | 68,000 | 77,000 | 50,000 | 100,000 | 300,000 | 350,000 |
| Separation (immediately after production) | ○ | ○ | ○ | ○ | ○ | ○ | ○ | ○ |
| Separation (after 72 hours at 200° C.) | X | X | ○ | ○ | ○ | ○ | ○ | ○ |
| Hardness | ○ | ○ | ○ | ○ | ○ | ○ | ○ | ○ |
| Flexibility | ○ | ○ | ○ | ○ | ○ | ○ | ○ | ○ |
| Adhesion to PVC (N/25 mm) | 170 | 140 | 130 | 130 | 125 | 120 | 125 | 125 |
| Adhesion to metal | ○ | ○ | ○ | ○ | ○ | ○ | ○ | ○ |
| Adhesion to PP (N/25 mm) |  |  |  |  |  |  |  |  |
| (1) Initial (N/25 mm) | 150 | 200 | 140 | 150 | 170 | 175 | 170 | 160 |
| (2) Under heat and moisture (80° C., 95% RH, 96 h) (N/25 mm) | 50 | 55 | 60 | 60 | 70 | 70 | 65 | 60 |
| Moldability |  |  |  |  |  |  |  |  |
| (1) Mold pourability | ○ | ○ | ○ | ○ | ○ | ○ | ○ | ○ |
| (2) Mold releasability | ○ | ○ | ○ | ○ | ○ | ○ | ○ | ○ |
| Gasoline resistance | ○ | ○ | ○ | ○ | ○ | ○ | ○ | ○ |

TABLE 2-continued (Part 2)

|  | Example 9 | Example 10 | Comp. Ex. 1 | Comp. Ex. 2 | Comp. Ex. 3 | Comp. Ex. 4 | Comp. Ex. 5 |
|---|---|---|---|---|---|---|---|
| Polyolefin-based hot-melt resin |  |  | 100 |  |  |  |  |
| Polyester A | 17.8 | 11.3 |  | 18.2 | 9.4 | 9.4 | 15 |
| Polyester B | 23.8 | 15 |  | 24.3 | 12.5 | 12.5 | 40 |
| Polyester C | 17.8 | 11.3 |  | 18.2 | 9.4 | 9.4 | 15 |
| Polyester D | 35.6 | 22.5 |  | 36.4 | 18.8 | 18.8 | 30 |
| Polypropylene |  |  |  |  |  | 50 |  |
| Low-density polyethylene |  |  |  |  |  |  |  |
| Polyethylene having epoxy groups | 5 | 40 |  | 3 | 50 |  |  |
| Polyethylene having epoxy groups and maleic acid groups |  |  |  |  |  |  |  |
| Rosin-based tackifier |  |  |  | 20 | 20 | 20 | 20 |
| Petroleum resin-based tackifier | 20 | 20 |  |  |  |  |  |
| Polycarbonate diol | 5 | 5 | 5 | 5 | 5 | 5 | 5 |
| Antidegradant | 0.5 | 0.5 | 0.5 | 0.5 | 0.5 | 0.5 | 0.5 |
| Viscosity (mPa · s) | 53,000 | 400,000 | 80,000 | 50,000 | >1,000,000 | 50,000 | 40,000 |
| Separation (immediately after production) | ○ | ○ | — | ○ | — | ○ | ○ |
| Separation (after 72 hours at 200° C.) | ○ | ○ | ○ | ○ | — | X | ○ |
| Hardness | ○ | ○ | ○ | ○ | — | ○ | ○ |
| Flexibility | ○ | ○ | ○ | ○ | — | ○ | ○ |
| Adhesion to PVC (N/25 mm) | 130 | 170 | X | 180 | — | X | 200 |
| Adhesion to metal | ○ | ○ | X | ○ | — | X | ○ |
| Adhesion to PP (N/25 mm) |  |  |  |  |  |  |  |
| (1) Initial (N/25 mm) | 120 | 170 | 70 | X | — | 70 | 50 |
| (2) Under heat and moisture (80° C., 95% RH, 96 h) (N/25 mm) | 50 | 70 | 50 | X | — | 50 | X |
| Moldability |  |  |  |  |  |  |  |
| (1) Mold pourability | ○ | ○ | ○ | ○ | — | ○ | ○ |
| (2) Mold releasability | ○ | ○ | ○ | ○ | — | ○ | ○ |
| Gasoline resistance | ○ | ○ | X | ○ | — | X | ○ |

The ingredients appearing in Table 2 were as follows.

Polyolefin-based hot-melt resin: 777, produced by Kaetsu Corp.
Polypropylene: M142E, produced by Idemitsu Kosan Co., Ltd.
Low-density polyethylene: G807, produced by Sumitomo Chemical Co., Ltd.
Polyethylene having epoxy groups: BONDFAST 7L, produced by Sumitomo Chemical Co., Ltd.
Polyethylene having epoxy groups and maleic acid groups: ADMER SF-715, produced by Mitsui Chemicals, Inc.
Rosin-based tackifier: PINECRYSTAL KE-6011, produced by Arakawa Chemical Industries, Ltd.
Petroleum resin-based tackifier: ARKON P-125, produced by Arakawa Chemical Industries, Ltd.
Polycarbonate diol: PRACCEL CD220, produced by Daicel Chemical Industries, Ltd.
Antidegradant: Irganox 1010, produced by Ciba Specialty Chemicals K.K.

As is apparent from the results shown in Table 2, the olefin-based hot-melt resin (Comparative Example 1) had a low PVC adhesion, a low metal adhesion and a low gasoline resistance. Both the molding resin composition which had a low polyolefin (d) content (Comparative Example 2) and the molding resin composition which contained no polyolefin (d) (Comparative Example 5) had a low PP adhesion. The molding resin composition which had a high content of the polyolefin (d) having epoxy groups (Comparative Example 3) had too high a viscosity. The molding resin composition which had a high content of polyolefin (d) (Comparative Example 4) had a low PVC adhesion, a low metal adhesion, and a low gasoline resistance.

By contrast the molding resin compositions of the invention (Examples 1 to 10) all had a relatively low viscosity, a high flexibility, excellent PVC adhesion, metal adhesion and PP adhesion, an excellent moldability, and an excellent gasoline resistance.

The invention claimed is:

1. A molding resin composition comprising (a) an aromatic polyester, (b) a tackifier, (c) a polyol compound having two or more hydroxy groups per molecule, and (d) a polyolefin, wherein the polyolefin (d) is present in an amount of 5 to 40 parts by weight per 100 parts by weight of the aromatic polyester (a) and the polyolefin (d) combined.

2. The molding resin composition of claim 1, wherein the polyolefin (d) has polar groups.

3. The molding resin composition of claim 2, wherein the polar groups are of at least one type selected from the group consisting of epoxy, carboxy and acid anhydride groups.

4. The molding resin composition of claim 1, wherein the polyolefin (d) has epoxy groups, and carboxy groups and/or acid anhydride groups.

5. The molding resin composition of claim 3, wherein the carboxy groups are carboxy groups derived from maleic acid and the acid anhydride groups are maleic anhydride groups.

6. The molding resin composition of claim 1, wherein the tackifier (b) is present in an amount of 1 to 50 parts by weight per 100 parts by weight of the aromatic polyester (a) and the polyolefin (d) combined.

7. The molding resin composition of claim 1, wherein the polyol compound (c) is present in an amount of 0.5 to 50 parts by weight per 100 parts by weight of the aromatic polyester (a) and the polyolefin (d) combined.

8. The molding resin composition of claim 1, wherein said composition has a viscosity at 190° C. of 10 to 500 Pa·s.

9. The molding resin composition of claim 1, wherein the aromatic polyester (a) is a polyester obtained by reacting an acid component which includes terephthalic acid and/or isophthalic acid with a hydroxy group component which includes at least one selected from the group consisting of ethylene glycol, polytetramethylene ether glycol, neopentyl glycol and 1,4-butanediol.

10. The molding resin composition of claim 1, wherein the aromatic polyester (a) comprises:

a polyester A obtained by reacting an acid component which includes terephthalic acid and isophthalic acid with a hydroxy group component which includes ethylene glycol and neopentyl glycol; and a polyester B obtained by reacting an acid component which includes terephthalic acid and isophthalic acid with a hydroxy group component which includes 1,4-butanediol and polytetramethylene ether glycol.

11. The molding resin composition of claim 10, wherein the aromatic polyester (a) further comprises a polyester C obtained by reacting an acid component which includes terephthalic acid, isophthalic acid and sebacic acid with a hydroxy group component which includes 1,4-butanediol.

12. The molding resin composition of claim 10, wherein the aromatic polyester (a) further comprises a polyester D obtained by reacting an acid component which includes terephthalic acid, isophthalic acid and ε-caprolactone with a hydroxy group component which includes 1,4-butanediol.

13. The molding resin composition of claim 1, wherein the tackifier (b) is a rosin-based tackifier.

14. The molding resin composition of claim 13, wherein the rosin-based tackifier is a rosin diol.

* * * * *